(12) United States Patent
Lee et al.

(10) Patent No.: US 9,317,275 B2
(45) Date of Patent: Apr. 19, 2016

(54) COMPUTER SYSTEM AND PROGRAM RESTORING METHOD THEREOF

(75) Inventors: Jong-hwa Lee, Suwon-si (KR); Jae-hwan Kim, Seoul (KR); Min-hyung Lee, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 72 days.

(21) Appl. No.: 13/285,123

(22) Filed: Oct. 31, 2011

(65) Prior Publication Data

US 2012/0185841 A1   Jul. 19, 2012

(30) Foreign Application Priority Data

Jan. 17, 2011   (KR) .................. 10-2011-0004612

(51) Int. Cl.
  *G06F 9/44*   (2006.01)
  *G06F 9/445*  (2006.01)
  *G06F 11/14*  (2006.01)

(52) U.S. Cl.
  CPC  *G06F 8/65* (2013.01); *G06F 9/445* (2013.01); *G06F 11/1433* (2013.01)

(58) Field of Classification Search
  None
  See application file for complete search history.

(56) References Cited

U.S. PATENT DOCUMENTS

| | | | | |
|---|---|---|---|---|
| 6,327,653 B1 * | 12/2001 | Lee | ..................... | G06F 9/4406 710/104 |
| 7,024,581 B1 * | 4/2006 | Wang | .................. | G06F 11/1417 713/2 |
| 7,114,184 B2 * | 9/2006 | Malivanchuk | .......... | G06F 21/56 713/188 |
| 7,437,545 B2 * | 10/2008 | Haustein | ............. | G06F 11/1417 713/1 |
| 7,536,598 B2 * | 5/2009 | Largman | ............. | G06F 11/1417 714/13 |
| 7,899,788 B2 * | 3/2011 | Chandhok | ........... | G06F 11/1458 707/640 |
| 7,913,246 B2 * | 3/2011 | Hammond | ................ | G06F 8/65 340/538 |
| 8,099,572 B1 * | 1/2012 | Arora | ..................... | G06F 13/28 707/640 |
| 8,112,505 B1 * | 2/2012 | Ben-Shaul | ........ | G06F 17/30168 709/217 |
| 8,392,569 B2 * | 3/2013 | Takeda | ..................... | G06F 8/65 707/822 |
| 2003/0097533 A1 * | 5/2003 | Maeda | ................ | G06F 11/1466 711/162 |

(Continued)

FOREIGN PATENT DOCUMENTS

| CN | 1536485 | 10/2004 |
|---|---|---|
| CN | 101785239 | 7/2010 |
| KR | 10-2011-0021183 | 3/2011 |

OTHER PUBLICATIONS

European Search Report dated Feb. 25, 2013 issued in EP Application No. 12150805.5.

(Continued)

*Primary Examiner* — Wei Zhen
*Assistant Examiner* — Hossain Morshed
(74) *Attorney, Agent, or Firm* — Staas & Halsey LLP

(57) ABSTRACT

Disclosed are a computer system storing with a restoration program and a method of updating the restoration program, the computer system including: a first storage unit in which a predetermined program is installed, a second storage unit in which a restoration program corresponding to the program is stored, a communication unit which communicates with an external server, a user input unit, and a controller which stores an update file corresponding to the program received from the external server in the first storage unit, and updates the program installed in the first storage with the update file, the controller updating the restoration program of the second storage unit with the update file of the first storage unit if receiving a certain key input through the user input unit, and restoring the program on the basis of the updated restoration program.

16 Claims, 6 Drawing Sheets

(56) References Cited

U.S. PATENT DOCUMENTS

| | | | |
|---|---|---|---|
| 2004/0003266 A1* | 1/2004 | Moshir | G06F 8/65 713/191 |
| 2004/0044890 A1* | 3/2004 | Lim | G06F 9/4406 713/2 |
| 2004/0107199 A1* | 6/2004 | Dalrymple, III | G06F 11/1451 |
| 2006/0248162 A1* | 11/2006 | Kawasaki | G06F 8/65 709/217 |
| 2007/0027933 A1* | 2/2007 | Lavin | G06F 11/1417 |
| 2007/0106993 A1* | 5/2007 | Largman | G06F 9/5077 718/104 |
| 2007/0150886 A1* | 6/2007 | Shapiro | G06F 8/61 717/174 |
| 2007/0220021 A1* | 9/2007 | Kato | G06F 17/30017 |
| 2007/0220506 A1* | 9/2007 | Maruyama | G06F 8/65 717/168 |
| 2008/0155242 A1* | 6/2008 | Beelitz | G06F 21/575 713/2 |
| 2008/0155302 A1* | 6/2008 | Mue | G06F 11/1469 714/2 |
| 2008/0288767 A1* | 11/2008 | Wang | G06F 11/1417 713/2 |
| 2009/0183254 A1* | 7/2009 | Franco | G06F 21/34 726/17 |
| 2011/0010705 A1* | 1/2011 | Adams | G06F 12/1458 717/178 |
| 2011/0055299 A1* | 3/2011 | Phillips | G06F 9/45533 707/827 |
| 2011/0055629 A1* | 3/2011 | Lee | G06F 11/1469 714/15 |
| 2011/0106755 A1* | 5/2011 | Hao | G06F 11/1451 707/610 |
| 2011/0185165 A1* | 7/2011 | Haga | G06F 21/57 713/2 |
| 2011/0239209 A1* | 9/2011 | Kotani | G06F 8/65 717/171 |
| 2012/0047499 A1* | 2/2012 | Krzystofczyk | G06F 8/63 717/174 |
| 2012/0173655 A1* | 7/2012 | McEntee | H04L 67/1097 709/216 |
| 2012/0221892 A1* | 8/2012 | Lee | G06F 11/1469 714/15 |
| 2013/0138701 A1* | 5/2013 | Jin | G06F 17/30734 707/803 |
| 2013/0212433 A1* | 8/2013 | Gunabalasubramaniam | G06F 11/1417 714/19 |
| 2014/0019420 A1* | 1/2014 | Kushwah | G06F 11/1469 707/679 |
| 2014/0165208 A1* | 6/2014 | Chevallier-Mames | G06F 21/14 726/26 |
| 2014/0180961 A1* | 6/2014 | Hankins | G06Q 10/10 705/348 |
| 2014/0208431 A1* | 7/2014 | Archer | G06F 21/577 726/25 |
| 2014/0258986 A1* | 9/2014 | Wang | G06F 11/3684 717/126 |
| 2015/0082263 A1* | 3/2015 | Vasudevan | G06F 17/504 716/106 |

OTHER PUBLICATIONS

Chinese Office Action dated Sep. 2, 2015 in corresponding Chinese Patent Application No. 201210014957.2, 15 pages.

* cited by examiner

COMPUTER SYSTEM AND PROGRAM RESTORING METHOD THEREOF

CROSS-REFERENCE TO RELATED APPLICATIONS

This application claims priority under 35 U.S.C. §119 from Korean Patent Application No. 10-2011-0004612, filed on Jan. 17, 2011 in the Korean Intellectual Property Office, the disclosure of which is incorporated herein by reference in its entirety.

BACKGROUND OF THE INVENTION

1. Field of the Invention

The present general inventive concept relates to a computer system and a program restoring method thereof, and more particularly to a computer system storing with a restoration program and a restoring method using the restoration program.

2. Description of the Related Art

In general, a computer system performs various functions through hardware such as a central processing unit (CPU), and software such as an operating system, a device driver, and an application. In the case of the software, update is often periodically provided by an external server or the like with development of its technology. However, the updated software may have a problem with its operation due to various factors, for example, if it is infected with a virus while using a computer system, deleted by mistake, modified, or etc. At this time, the updated software having the problem has to be restored or recovered, but a restoration solution initially provided by a manufacturer of a computer system provides only a previous version of software. Thus, a user has to access the external server or the like after restoring the software, and then update the restored software with the latest version.

SUMMARY OF THE INVENTION

Accordingly, one or more exemplary embodiments provide a computer system and a program restoring method thereof, in which a user has no need of separately updating software with the latest version even though the software in the computer system is restored.

Additional features, utilities, and advantages of the present general inventive concept will be set forth in part in the description which follows and, in part, will be obvious from the description, or may be learned by practice of the general inventive concept.

The foregoing and/or other features and utilities may be achieved by providing a computer system including: a first storage unit in which a predetermined program is installed, a second storage unit in which a restoration program corresponding to the program is stored, a communication unit which communicates with an external server, a user input unit, and a controller which stores an update file corresponding to the program received from the external server in the first storage unit, and updates the program installed in the first storage with the update file, wherein the controller updates the restoration program of the second storage unit with the update file of the first storage unit if receiving a certain key input through the user input unit, and restores the program on the basis of the updated restoration program.

The first storage unit may further store a program list including a list of the program, and the controller may update the program list of the first storage unit on the basis of information about the updated program.

The second storage unit may further store a restoration program list including a list of the restoration program, and the controller may compare a restoration program list of the second storage unit with the program list of the first storage unit, select a restoration program of the second storage unit to be updated on the basis of the program list of the first storage unit if the restoration program list of the second storage unit and the program list of the first storage unit are different from each other, and select and store the update file of the first storage unit corresponding to the selected restoration program in the second storage unit.

The controller may update the restoration program of the second storage unit with the update file stored in the second storage unit, and update the restoration program list of the second storage unit on the basis of information of an updated restoration program if the restoration program of the second storage unit is updated.

Each of the program list and the restoration program list may include at least one of an identification number, a name, explanation, version information, and an installation method of each program.

The first storage unit may include a first operating system installed therein, and the controller may receive the update file from the external server through the communication unit under the first operating system.

The second storage unit may include a second operating system installed therein, and the controller may boot up the second operating system if receiving the certain key input, access the first storage unit and update the restoration program of the second storage unit with the update file.

The controller cannot access the second storage unit normally under the first operating system.

Other features and utilities of the present general inventive concept may be achieved by providing a computer system including: a first storage unit in which a predetermined program is installed, a second storage unit in which a restoration program corresponding to the program is stored, a communication unit which communicates with an external server, a user input unit, an interface unit which can access the second storage unit, and a controller which stores an update file corresponding to the program received from the external server in the first storage unit, and updates the program installed in the first storage with the update file, wherein the controller accesses the second storage unit through the interface unit and updates the restoration program of the second storage unit with the update file of the first storage unit, and wherein the controller restores the program with the updated restoration program if receiving a certain key input through the user input unit.

The first storage unit may further store a program list including a list of the program, and the controller may update the program list of the first storage unit on the basis of information about the updated program.

The second storage unit may further store a restoration program list including a list of the restoration program, and the controller may compare a restoration program list of the second storage unit with the program list of the first storage unit, select a restoration program of the second storage unit to be updated on the basis of the program list of the first storage unit if the restoration program list of the second storage unit and the program list of the first storage unit are different from each other, and select and store the update file of the first storage unit corresponding to the selected restoration program in the second storage unit through the interface unit.

The controller may update the restoration program of the second storage unit with the update file stored in the second storage unit, and update the restoration program list of the second storage unit on the basis of information of an updated restoration program if the restoration program of the second storage unit is updated.

Each of the program list and the restoration program list may include at least one of an identification number, a name, explanation, version information, and an installation method of each program.

The first storage unit may further include a first operating system installed therein, and the controller may receive the update file from the external server through the communication unit under the first operating system.

The second storage unit may include a second operating system installed therein, and the controller may boot up the second operating system if receiving the certain key input, and restore the program with the updated restoration program.

The controller cannot access the second storage unit normally under the first operating system.

Still other features and utilities of the present general inventive concept may be achieved by providing a program restoring method of a computer system, the method including: receiving an update file corresponding to a predetermined program installed in the first storage unit, storing the received update file in the first storage unit, updating the program with the stored update file, updating the restoration program stored in a second storage unit and corresponding to the program on the basis of the update file of the first storage unit if receiving a certain key input through a user input unit, and restoring the program with the updated restoration program.

The first storage unit may further store a program list including a list of the program, the method further including updating the program list of the first storage unit on the basis of information about the updated program.

The second storage unit may further store a restoration program list including a list of the restoration program, the method further including: comparing a restoration program list of the second storage unit with the program list of the first storage unit, selecting a restoration program of the second storage unit to be updated on the basis of the program list of the first storage unit if the restoration program list of the second storage unit and the program list of the first storage unit are different from each other, and selecting and storing the update file of the first storage unit corresponding to the selected restoration program in the second storage unit.

The updating the restoration program may include updating the restoration program of the second storage unit with the update file stored in the second storage unit, the method further including updating the restoration program list of the second storage unit on the basis of information of an updated restoration program if the restoration program of the second storage unit is updated.

Each of the program list and the restoration program list may include at least one of an identification number, a name, explanation, version information, and an installation method of each program.

The first storage unit may include a first operating system installed therein, the receiving the update file including receiving the update file from the external server through the communication unit under the first operating system.

The second storage unit may include a second operating system installed therein, the updating the restoration program including booting up the second operating system if receiving the certain key input, accessing the first storage unit and updating the restoration program of the second storage unit with the update file.

The second storage unit may not be accessible normally under the first operating system.

Yet other features and utilities of the present general inventive concept may be achieved by providing a program restoring method of a computer system, the method including: receiving an update file corresponding to a predetermined program installed in the first storage unit, storing the received update file in the first storage unit, updating the program with the stored update file, accessing the second storage unit through an interface unit capable of accessing the second storage unit in which a restoration program corresponding to the program is stored, and updating the restoration program of the second storage unit on the basis of the update file of the first storage unit, and restoring the program with the updated restoration program if receiving a certain key input through a user input unit The first storage unit may further store a program list including a list of the program, the method further including updating the program list of the first storage unit on the basis of information about the updated program.

The second storage unit may further store a restoration program list including a list of the restoration program, the method further including comparing a restoration program list of the second storage unit with the program list of the first storage unit, selecting a restoration program of the second storage unit to be updated on the basis of the program list of the first storage unit if the restoration program list of the second storage unit and the program list of the first storage unit are different from each other, and selecting and storing the update file of the first storage unit corresponding to the selected restoration program in the second storage unit.

The updating the restoration program may include updating the restoration program of the second storage unit with the update file stored in the second storage unit, the method further including updating the restoration program list of the second storage unit on the basis of information of an updated restoration program if the restoration program of the second storage unit is updated.

Each of the program list and the restoration program list may include at least one of an identification number, a name, explanation, version information, and an installation method of each program.

The first storage unit may include a first operating system installed therein, the receiving the update file including receiving the update file from the external server through the communication unit under the first operating system.

The second storage unit may include a second operating system installed therein, the restoring the restoration program including booting up the second operating system if receiving the certain key input, and restoring the program with the updated restoration program.

The second storage unit may not be accessible normally under the first operating system.

Other features and utilities of the present general inventive concept may be achieved by a computer device including a first storage unit to store software that includes at least one program installed in the first storage unit, a second storage unit being inaccessible via the software of the first storage unit and configured to store at least one restoration program corresponding to the at least one program, and a controller to control storing of at least one update file corresponding to the at least one program in the first storage unit, and to update the at least one program and the restoration program with the at least one update file.

The second storage unit may be inaccessible via the software of the first storage unit.

The first storage unit may be further configured to store a program list including a list of the at least one program and information regarding the at least one program, and the controller may update the program list of the first storage unit after updating the at least one program. The second storage unit may be further configured to store a restoration program list including a list of the at least one restoration program and information regarding the at least one restoration program, and the controller may update the restoration program list of the second storage unit after updating the at least one restoration program. The controller may compare the program list and the restoration program list, and select one of the at least one restoration program to update from the restoration program list based on the comparison.

The software may further include a first operating system to run the computer device, and the at least one program may be updated under the first operating system. The second storage unit may further include a second operating system installed therein, and the controller may boot up the computer device using the second operating system upon receiving a restore key. The first storage unit may be accessible under the first and second operating systems. The second storage unit may be accessible under the second operating system and inaccessible under the first operating system.

The first and the second storage units may be within a single storage device and are located in different partitions. The second storage unit may be a hidden partition of the hard disk drive that is not recognized by the first operating system. A partition table included in a master boot record may determine the hidden partition for the second storage unit.

The controller may update the restoration program based on the at least one update file under the second operating system. The at least one update file may be copied from the first storage unit and stored in the second storage unit, and the at least one update file stored in the second storage unit may be used to update the restoration program under the second operating system.

The controller may restore the at least one program in the first storage unit using the updated restoration program in the second storage unit.

The first storage unit may further include an interface component that provides an interface to access the second storage unit.

Other features and utilities of the present general inventive concept may be achieved by a program restoring method of a computer system, the method including storing in a first storage unit software including at least one program installed in the first storage unit; storing in a second storage unit at least one restoration program corresponding to the at least one program; storing of at least one update file corresponding to the at least one program in the first storage unit; and updating the at least one program and the restoration program with the at least one update file.

The second storage unit may be inaccessible via the software of the first storage unit.

The first storage unit may further be configured to store a program list including a list of the at least one program and information regarding the at least one program, and the method may further include updating the program list of the first storage unit after updating the at least one program. The second storage unit may further be configured to store a restoration program list including a list of the at least one restoration program and information regarding the at least one restoration program, and the method may further include updating the restoration program list of the second storage unit after updating the at least one restoration program. The method may further include comparing the program list and the restoration program list; and selecting one of the at least one restoration program to update from the restoration program list based on the comparison.

The software may further include a first operating system to run the computer device, and the at least one program may be updated under the first operating system. The second storage unit may further include a second operating system installed therein, and the method may further include booting up the computer device using the second operating system upon receiving a restore key. The first storage unit may be accessible by the first and second operating systems. The second storage unit may be accessible by the second operating system and inaccessible by the first operating system.

The first and the second storage units may be located in different partitions within a single storage device. The second storage unit may be a hidden partition of the hard disk drive that is not recognized by the first operating system. A partition table included in a master boot record may determine the hidden partition for the second storage unit.

The restoration program may be updated based on the at least one update file under the second operating system. The at least one update file may be copied from the first storage unit and stored in the second storage unit, and the at least one update file stored in the second storage unit may be used to update the at least one restoration program under the second operating system.

The method may further include restoring the at least one program in the first storage unit using the updated at least one restoration program in the second storage unit.

The first storage unit may further include an interface component that provides an interface to access the second storage unit.

BRIEF DESCRIPTION OF THE DRAWINGS

The above and/or other features, utilities, and advantages of the present general inventive concept will become apparent and more readily appreciated from the following description of the exemplary embodiments, taken in conjunction with the accompanying drawings, in which.

DETAILED DESCRIPTION OF PREFERRED EMBODIMENTS

Figure 1:
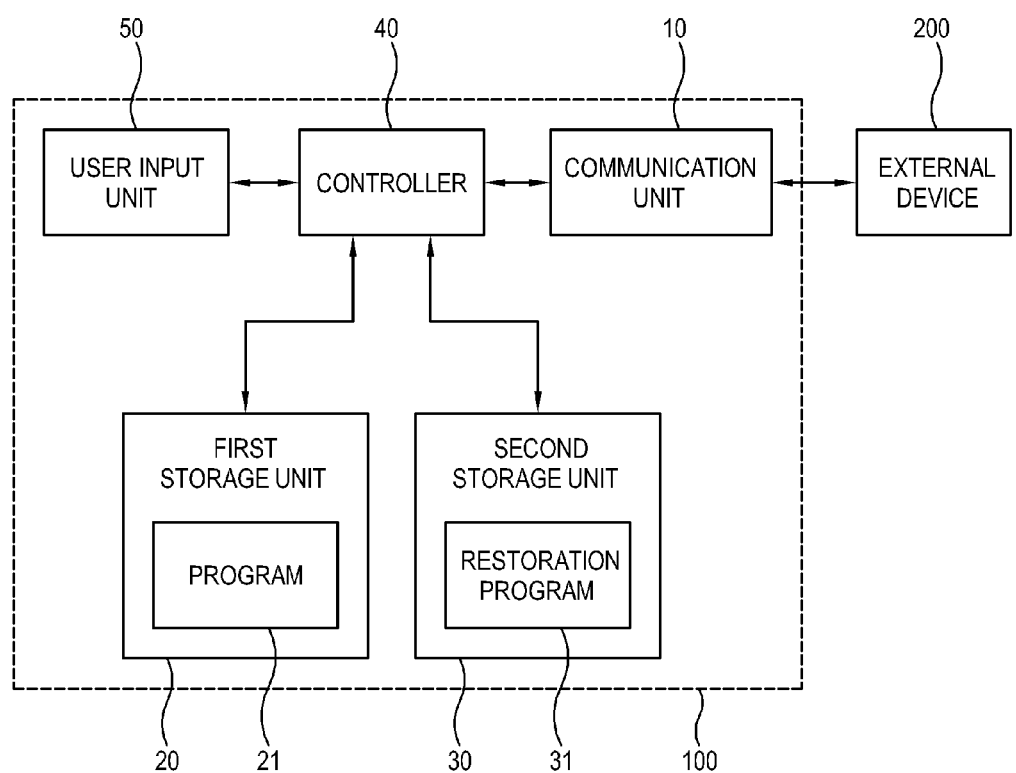
FIG. 1 is a block diagram showing a configuration of a computer system according to an exemplary embodiment.

Reference will now be made in detail to the embodiments of the present general inventive concept, examples of which are illustrated in the accompanying drawings, wherein like reference numerals refer to the like elements throughout. The embodiments are illustrated below in order to explain the present general inventive concept while referring to the figures. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram showing a configuration of a computer system according to an exemplary embodiment. As shown therein, the computer system 100 may communicate with an external device 200 through a communication unit 10.

The computer system 100 may include a desktop or a laptop personal computer (PC). Also, the computer system 100 may include not only a general PC but also any type of electronic device having a function in accordance with the PC such as a smartbook, a mobile internet device (MID), a Netbook, mobile phones, digital media players, etc. The computer system 100 stores a restoration program 31 corresponding to a program 21 installed in the computer system 100. Thus, if the program 21 is infected with a virus while using the computer system 100, is deleted by mistake, is modified, or etc, and thus operates abnormally, the program 21 can be restored or recovered using the restoration program 31.

The external device 200 includes an electronic device such as a PC, a server or a web server to communicate with the communication unit 10 of the computer system 100. The computer system 100 can communicate with the external device 200 through the communication unit 10, and thus can receive/transmit various data through the communication unit 10. The computer system 100 transmits information about the computer system 100 to the external device 200 through the communication unit 10, and requests an up-to-date program list. In response to the request, the external device 200 sends the computer system 100 the up-to-date program list corresponding to the information about the computer system 100 received from the computer system 100. The computer system 100 receiving the response selects a program that needs to be updated among the programs 21 installed in the current computer system 100 from the received up-to-date program list, and requests an update file for the selected program from the external device 200, thereby performing an update.

According to an exemplary embodiment, there are provided a method and configuration for updating a restoration program stored in the computer system 100 in association with an update of the program.

The computer system 100 includes the communication unit 10, a first storage unit 20, a second storage unit 30, a controller 40, and a user input unit 50.

The communication unit 10 may include a local area network (LAN) module or a wireless local area network (WLAN) module capable of performing wired or wireless network communication with the external device 200.

The first storage unit 20 and the second storage unit 30 may be non-volatile memories continuing to store data of the computer system 100. The first storage unit 20 and the second storage unit 30 may be achieved by implementing hard disk drives respective to the first and second storage units 20 and 30, or a single hard disk drive for both the first and second storage units 20 and 30. In the latter case, the first storage 20 and the second storage 30 may be divided into partitions within the single hard drive. Hereinafter, the first storage unit 20 will be called a main partition, and the second storage unit 30 will be called a hidden partition. Alternatively, at least one of the first storage unit 20 and the second storage unit 30 may be a solid state drive (SSD).

The first storage unit 20 stores at least one program 21. At least one program 21 is software, which includes at least one of a device driver and an application of the computer system 100. The computer system 100 may further include at least one peripheral device (not shown) corresponding to the device driver. The peripheral device (not shown) may include a universal serial bus (USB) storage device, a USB input/output (I/O) device, a graphic card, a sound card, a network card, etc. The peripheral device may be connected via various interfaces such as a USB interface, a parallel port, a serial port, a Peripheral Component Interconnect (PCI) interface, etc.

At least one program 21 may be stored in the first storage unit 20 in a proper form for the computer system 100 by taking smooth execution into account. In this case, at least one program 21 is in an installed state at the computer system 100. Also, a first operating system 22 (refer to FIGS. 2 and 3) of the computer system 100 may be additionally stored in the first storage unit 20. Further, the first storage unit 20 stores at least one first update file 23 (refer to FIGS. 2 and 3) corresponding to at least one program 21, received from the external device 200 through the communication unit 10.

The second storage unit 30 stores at least one restoration program for at least one program 21. The restoration program 31 is software, which enables the program 21 to be restored, in the installed state. Also, a second operating system 32 (refer to FIGS. 2 and 3) of the computer system may be additionally stored in the second storage unit 30.

The first storage unit 20 and the second storage unit 30 have certain characteristics with regard to access to the data respectively stored therein by a predetermined application (not shown) or a user in accordance with which one of the first operating system 22 and the second operating system 32 is used. The first operating system 22 starts operating through a general (normal) booting process of the computer system 100, and the second operating system 32 is booted up and starts operating by a certain key received through the user input unit 50 to restore or to recover the program 21 installed in the computer system 100.

The first storage unit 20 can be freely accessed by a predetermined application (not shown) or a user under the first operating system 22 of the computer system 100. The first storage unit 20 is recognized by the first operating system 22 of the computer system 100 as a valid storage device, and is assigned with a proper drive letter such as "C," "D," etc. Thus, if the predetermined application (not shown), a user, or etc, requests access to data of the first storage unit 20, the first operating system 22 of the computer system 100 performs the corresponding access normally. Also, the first storage unit 20 is recognized as a valid storage device even under the second operating system 32 of the computer system 100. On the other hand, the second storage unit 30 cannot be normally accessed by a predetermined application (not shown) or a user under the first operating system 22. The second storage unit 30, which may be a hidden partition of the hard disk drive for providing the second storage unit 30, may not be recognized by the first operating system 22 as a normal drive that can be accessed normally. Whether the second storage unit 30 is the hidden partition may be determined by a partition table included in a master boot record (not shown), e.g., the first sector of the hard disk drive. The partition table of the master boot record of the hard disk drive contains information about a partition type of the hard disk drive to show whether the partition corresponding to the second storage unit 30 is the hidden partition. If the second storage unit 30 is the hidden partition, the first operating system 22 of the computer system 100 recognizes the second storage unit 30 as an abnormal drive, and does not assign a proper drive letter to the second storage unit 30. Thus, even though a predetermined application (not shown) or a user requests access to the data of the second storage unit 30 through the first operating system 22, the first operating system 22 does not normally allow the corresponding access. In other words, because access to the data of the second storage unit 30 is not normally allowed, the restoration program 31 stored in the second storage unit 30 is not exposed to a virus, hacking, or a user's mistake (e.g. accidental deletion or modification), or etc., so that stability and reliability of the restoration program 31 can be guaranteed. The second storage unit 30 can be recognized as a valid storage device under only the second operating system 32 of the computer system 100.

The controller 40 stores the update file such as the update file 23 that corresponds to the program 21 and is received from the external device 200, updates the program 21 installed in the first storage unit 10 on the basis of the first update file 23, and updates the restoration program 31 on the basis of the first update file 23 stored in the first storage unit 20. The controller 40 uses a processor (not shown) such as a central processing unit (CPU) and operates by executing an update management program 42 (refer to FIGS. 2 and 3) loaded into a main memory (not shown) such as a random access memory (RAM). Operations of the controller 40 according to a first exemplary embodiment will be illustrated in detail with reference to FIG. 2, and operations of the controller 40 according to a second exemplary embodiment will be illustrated in detail with reference to FIG. 3.

The user input unit 50 includes a keyboard, a mouse, etc. as an interface for receiving an input such as a user' selection input, and is capable of transmitting the user's input to the controller 40.

Figure 2:
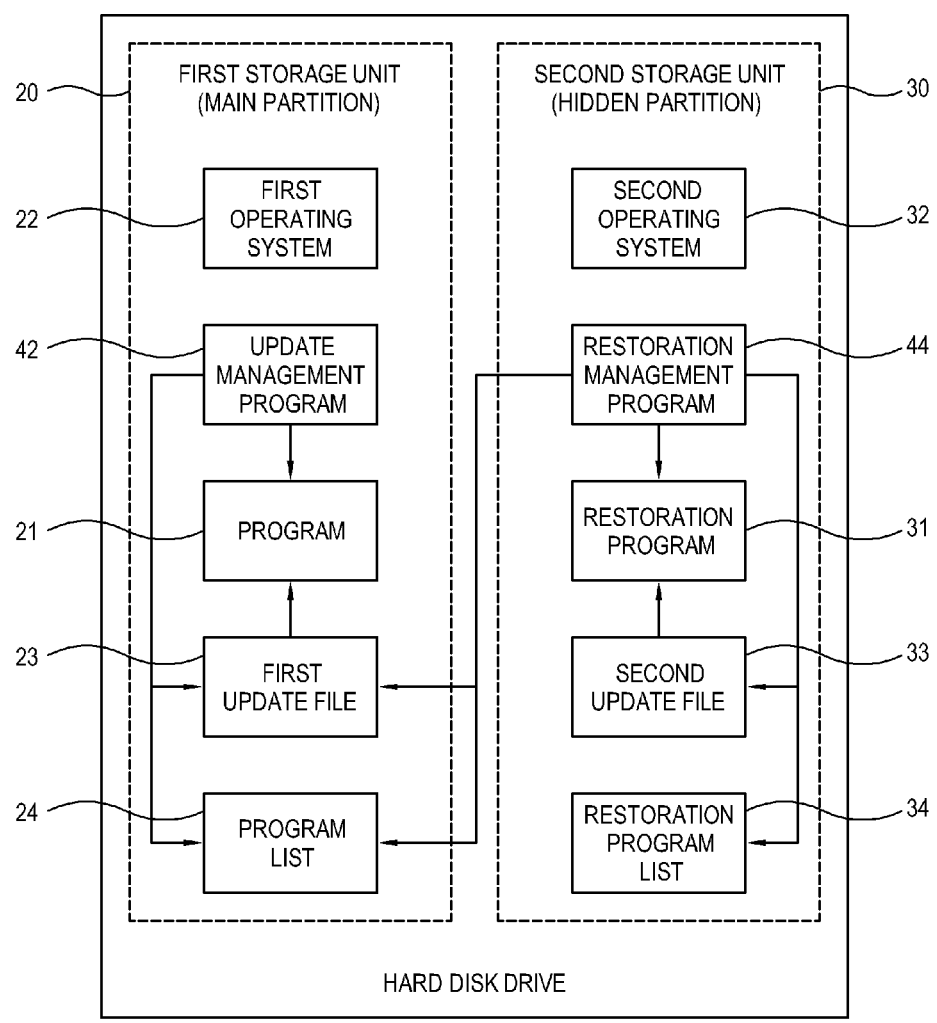
FIG. 2 is a block diagram showing a detailed configuration of a computer system according to a first exemplary embodiment.

Referring to FIG. 2, the operations of the controller 40 according to the first exemplary embodiment will be illustrated. As shown therein, the controller 40 controls the update management program 42 and a restoration management program 44. The update management program 42 is an application for generally managing an update process of the program 21. The controller 40 controls a program list 24 of at least one program 21 installed in the first storage unit 20 to be stored in the first storage unit 20. The program list 24 of at least one program 21 installed in the first storage unit 20 specifies an identification number, a name, explanation, version information, an installation method, etc. of each program.

The computer system 100 is normally booted up and thus the controller 40 operates under the first operating system 22. The controller 40 uses the processor (not shown) such as the CPU and operates by executing the update management program 42 (refer to FIGS. 2 and 3) loaded into the main memory (not shown) such as the random access memory (RAM). The controller 40 controls the communication unit 10 to transmit information (e.g., a product number, a firmware version, etc.) of the computer system 100 to the external device 200, thereby requesting the list of the up-to-date program(s). The external device 200 transmits the list of the up-to-date program(s) to the computer system 100 on the basis of the received information of the computer system 100. The controller 40 compares the latest up-to-date program list received from the external device 200 with the program list 24 of the first storage unit 20. As a result of the comparison, if it is determined that the program of the first storage unit 20 needs to be updated, the controller 40 controls the communication unit 10 to request and to receive an update file of the corresponding program from the external device 200, and stores the received update file in the first storage unit 20 as the first update file 23. The controller 40 updates the program 21 installed in the first storage unit 20 on the basis of the first update file 23, and also updates the program list 24 of the first storage unit 20.

If a certain key for restoring the program of the computer system 100 is input through the user input unit 50 such as a mouse or a keyboard connected via wire or wirelessly to the computer system 100 and allowing a user to input his/her selection, the computer system 100 is booted up by the second operating system 32. The reason why the computer system 100 is booted up by the second operating system 32 is because the program has to be restored when its operation is abnormal due to various factors such as, for example, cases where the first operating system 100 is infected with a virus while using the computer system 100, is deleted by mistake, is modified, or etc. Thus, the key for restoring the program may include indication of abnormal operation. In this case, the controller 40 uses the processor (not shown) such as the CPU and operates by executing the restoration management program 44 (refer to FIGS. 2 and 3) loaded into the main memory (not shown) such as the RAM. Since the first storage unit 20 can be recognized as a valid storage device even under the second operating system 32, the controller 40 accesses the first storage unit 20 and compares the program list 24 stored in the first storage unit 20 with the restoration program list 34 stored in the second storage unit 30. After the comparison, if it is determined that they are different from each other, the controller 40 selects a restoration program that needs to be updated among restoration programs on the restoration program list 34 on the basis of the program list 24 stored in the first storage unit 20. The controller 40 selects the first update file 23 for the program 21 corresponding to the selected restoration program 34 and stores the first update file 23 in the second storage unit 30 as the second update file 33. The controller 40 updates the restoration program 31 on the basis of the second update file 33 stored in the second storage unit 30, and also updates the restoration program list 34 of the second storage unit 30 accordingly. Thus, the controller 40 can restore the program 21 of the computer system 100 on the basis of the updated restoration program 34.

Figure 3:
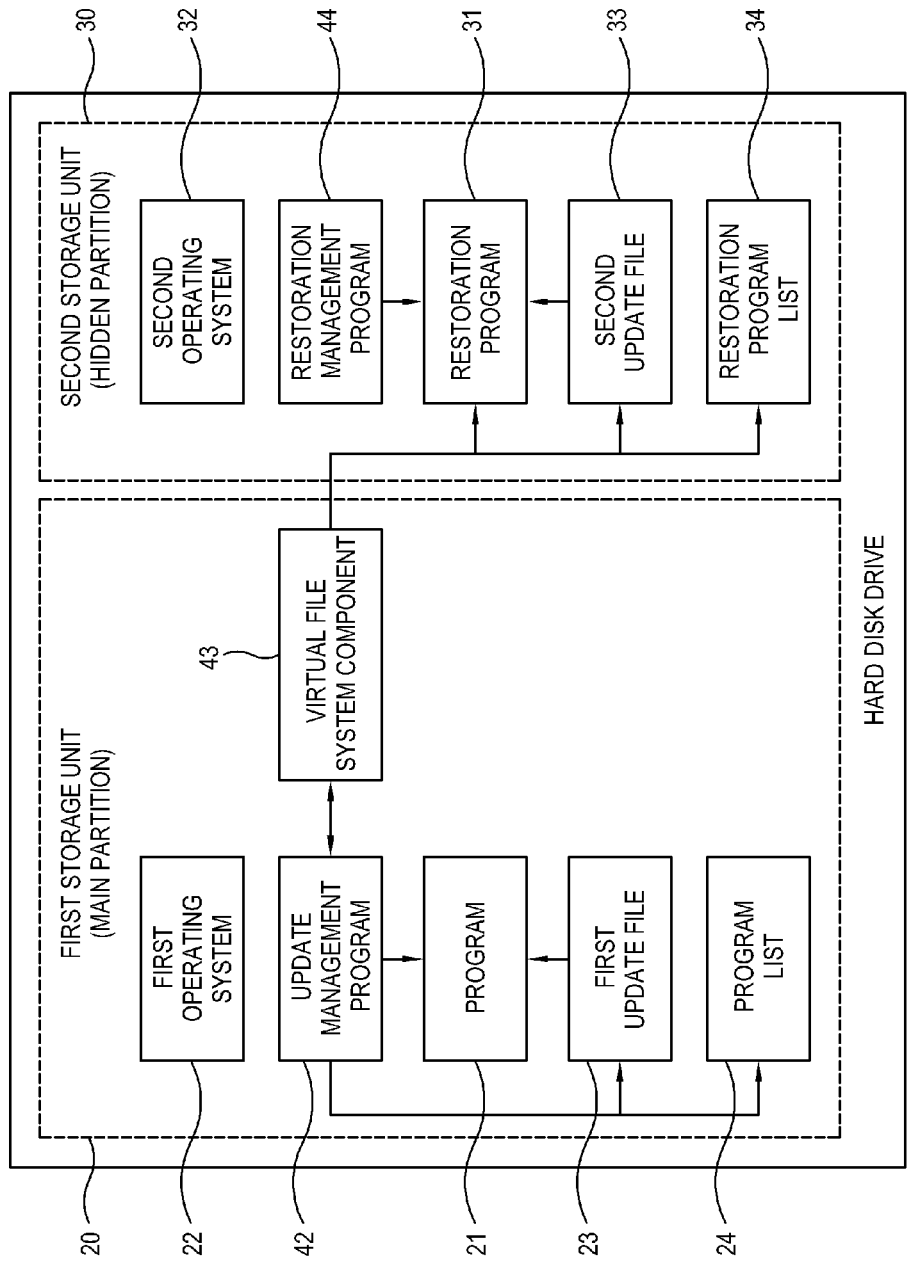
FIG. 3 is a block diagram showing a detailed configuration of a computer system according to a second exemplary embodiment.

Referring to FIG. 3, the operations of the controller 40 according to the second exemplary embodiment will be illustrated. The controller 40 according to the second exemplary embodiment performs similar operations as those illustrated in the first exemplary embodiment from requesting and receiving an update file for the program from the external device 200 to updating the program 21 and the program list 24 of the first storage unit 20. However, the controller 40 according to the second exemplary embodiment is different in only a process of updating the restoration program 31 from that of the first exemplary embodiment. Accordingly, repetitive descriptions will be avoided.

The controller 40 according to the second exemplary embodiment operates under the first operating system 22 of the computer system 100. The controller 40 in this exemplary embodiment controls the update management program 42 and a virtual file system component 43. The controller 40 uses the processor (not shown) such as the CPU and operates by executing the update management program 42 (refer to FIGS. 2 and 3) loaded into the main memory (not shown) such as the RAM. The second storage unit 30 is the hidden partition that cannot be normally accessed by the first operating system 22. Accordingly, the controller 40 cannot normally access the second storage unit 30 that stores the restoration program 31 therein, and therefore uses a separate configuration to replace the first operating system 22 in order to access the second storage unit 30. For example, in order to access the second storage unit 30 not recognized by the first operating system as a normal drive, the controller 40 uses a separate interface called the virtual file system component 43. The virtual file system component 43 provides an interface for access to files or data stored in the second storage unit 30 with regard to the update management program 42. The update management program 42 calls a function provided by the virtual file system component 43, thereby requesting the access to the file stored in the second storage unit 30. Also, the virtual file system component 43 accesses the file stored in the second storage unit 30 and returns an access result to the update management program 42 in response to a function call related to the file access with regard to the second storage unit 30 of the update management program 42.

The virtual file system component 43 accesses the second storage unit 30 and reads out the restoration program list 34 if the access to the second storage unit 30 is granted upon the access request. The read restoration program list 34 is copied to the main memory (not shown) such as the RAM. The controller 40 compares the read restoration program list 34 with the program list 24 stored in the first storage unit 20. After the comparison, if they are different from each other, the controller 40 selects a restoration program required to be updated among restoration programs on the restoration program list 34 on the basis of the program list 24 stored in the first storage unit 20, selects the first update file 23 of the program 21 corresponding to the selected restoration program 34, and stores it in the second storage unit 30 as the second update file 33 through the virtual file system component 43. The controller 40 updates the restoration program 31 with the second update file 33 stored in the second storage unit 30, and also updates the restoration program list 34 of the second storage unit 30.

Alternatively or additionally, the controller 40 according to the second exemplary embodiment may access the second storage unit 30 set as the hidden partition without using the virtual file system component 43. This can be achieved by changing the set of the partition table included in the master boot record (not shown), e.g., the first sector of the hard disk drive. In other words, the set of the partition table in the master boot record may be changed so that the second storage unit 30 may not be set as a hidden type. Then, the second storage unit 30 is recognized by the first operating system 22 as a normal drive and becomes accessible as desired, so that the controller 40 can update the restoration program of the second storage unit 30. If the restoration program is completely updated, the controller 40 may set the partition table included in the master boot record of the hard disk drive with regard to the second storage unit 30 as a hidden type.

If the restoration program is completely updated and a certain key for restoring the program of the computer system 100 is input through the user input unit 50, the computer system 100 is booted up by the second operating system 32. At this time, the controller 40 uses the processor (not shown) such as the CPU and operates by executing the restoration management program 44 (refer to FIGS. 2 and 3) loaded into the main memory (not shown) such as the RAM. Therefore, the restoration management program 44 restores the program 21 with the already updated restoration program 31. Thus, it is convenient for a user since the completely restored program 21 is already updated with the latest version.

According to the first and second exemplary embodiments, the controller 40 can determine whether the first storage unit 20 is infected with a virus or the like. If it is determined that the first storage unit 20 is not infected with the virus or the like, the controller 40 updates the restoration program and then restores the program according to the first and second exemplary embodiments. On the other hand, if it is determined that the first storage unit 20 is infected with the virus or the like, the controller 40 does not update the restoration program of the second storage unit on the basis of the update file of the first storage unit 20 according to the first and second exemplary embodiments. If the first storage unit is infected with the virus or the like, the update file of the first storage unit is likely to be also infected with the virus and it is thus not preferable that the restoration program of the second storage unit is updated with this update file. Accordingly, in this case, the controller 40 uses a restoration program that is not updated to restore the program.

Figure 4:
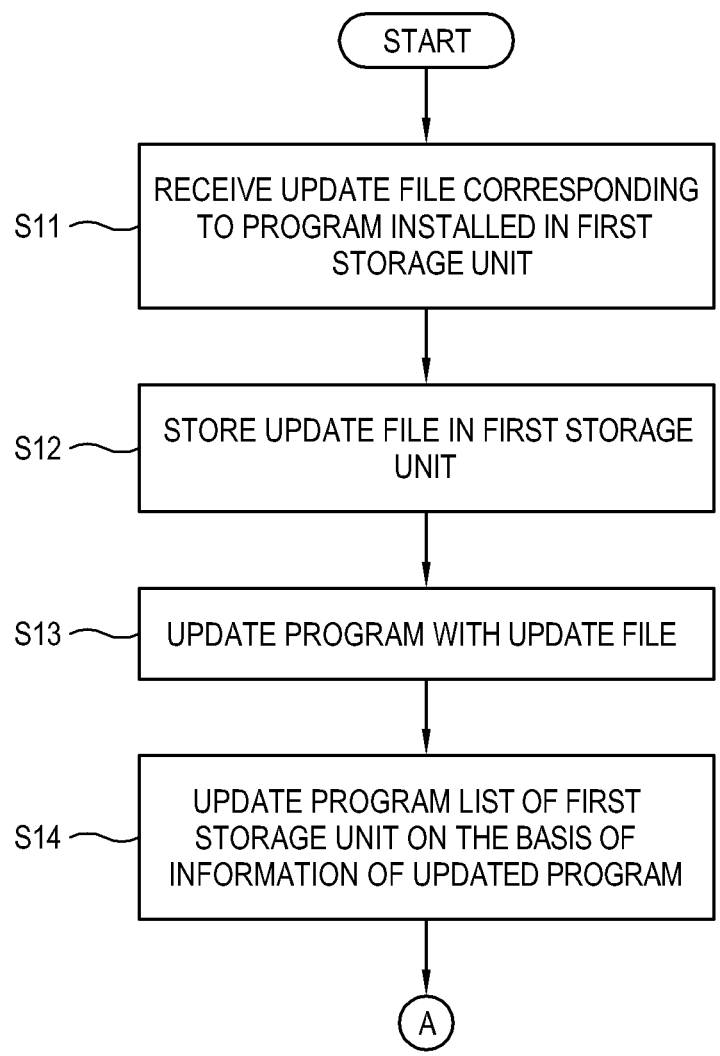
FIG. 4 is a flowchart showing operations of the computer system that can be performed for the first exemplary embodiment or the second exemplary embodiment.

FIG. 4 is a flowchart showing operations of the computer system that can be performed for the first exemplary embodiment or the second exemplary embodiment.

As shown in FIG. 4, if the computer system 100 receives an update file corresponding to the program 21 installed in the first storage unit 20 from the external device 200 through the communication unit 10 at operation S11, the controller 40 stores the update file as the first update file 23 in the first storage unit 20 at operation S12. The controller 40 updates the program 21 and the program list 24 with the stored first update file 23.

Figure 5:
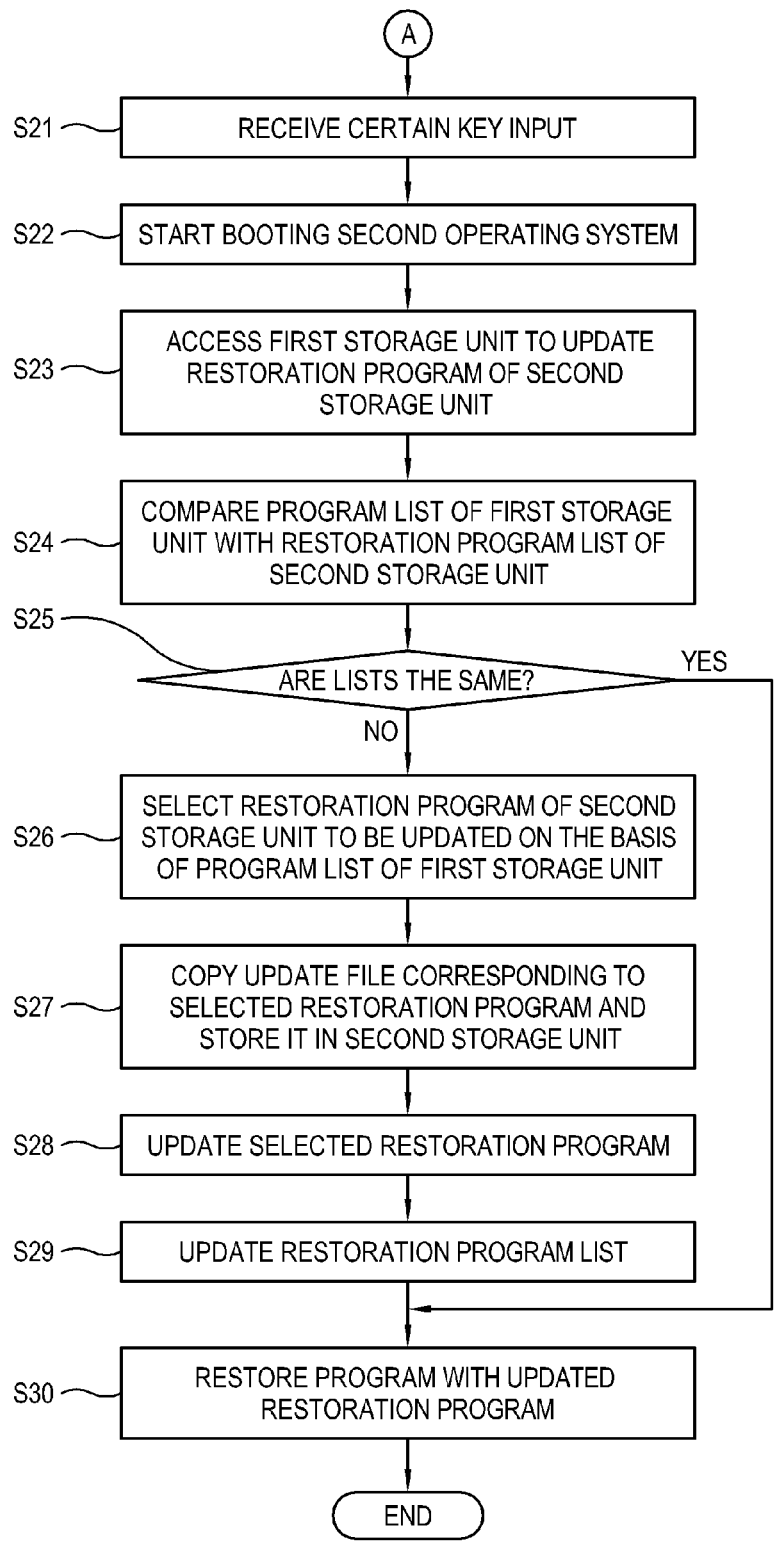
FIG. 5 is a flowchart showing operations of the computer system according to the first exemplary embodiment.

FIG. 5 is a flowchart showing operations of the computer system according to the first exemplary embodiment.

As shown in FIG. 5, if a certain key for restoring the program 21 of the computer system 100 is received from the user input unit 50 at operation S21, the computer system 100 is booted up by the second operating system 32 at operation S22. The controller 40 accesses the first storage unit 20 in order to update the restoration program of the second storage unit 30 at operation S23, and compares the program list 24 of the first storage unit 20 with the restoration program list 34 of the second storage unit 30 at operation S24. After the comparison, if it is determined that they are different from each other at operation S25, the controller 40 selects the restoration program of the second storage unit 30 to be updated on the basis of the program list of the first storage unit 20 at operation S26. The controller 40 selects and copies the first update file 23 of the program 21 corresponding to the selected restoration program 31, and stores it in the second storage unit 30 as the second update file 33 at operation S27. The controller 40 updates the selected restoration program 31 with the stored update file 33 at operation S28, and also updates the restoration program list 34 at operation S29. The controller 40 restores the program of the first storage unit 20 on the basis of the updated restoration program at operation S30.

Figure 6:
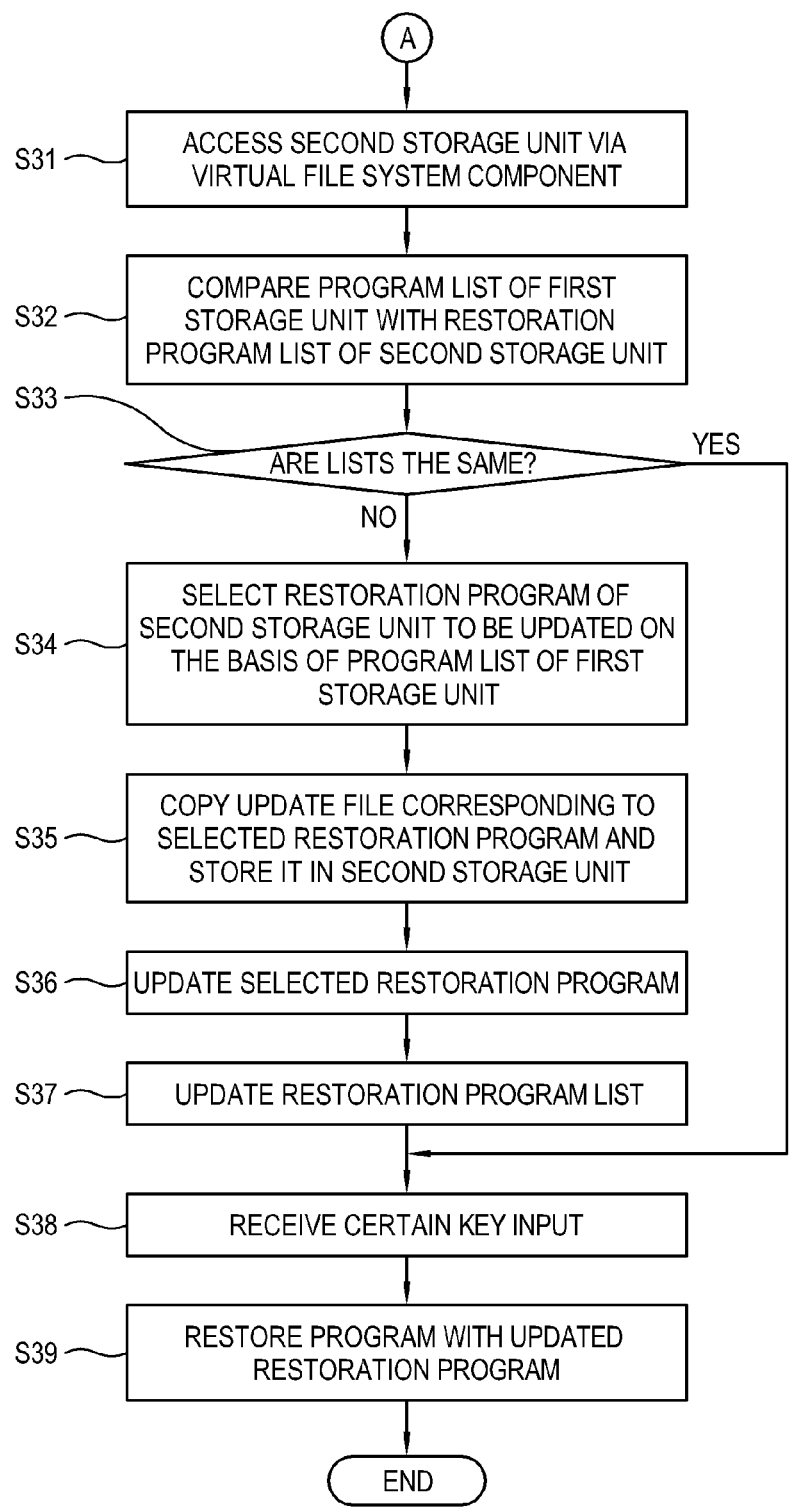
FIG. 6 is a flowchart showing operations of the computer system according to the second exemplary embodiment.

FIGS. 4 and 6 are flowcharts showing operations of the computer system according to the second exemplary embodiment. The operations shown in FIG. 4 may be equally applied to the computer system according to the second exemplary embodiment illustrated in FIG. 5.

As shown in FIG. 6, the controller 40 accesses the second storage unit 30 through the virtual file system component 43 at operation S31. The controller 40 compares the program list 24 of the first storage unit 20 with the restoration program 34 of the second storage unit 30 at operation S32. As a result of comparison, if it is determined that the program list 24 of the first storage unit 20 and the restoration program 34 of the second storage unit 30 are different from each other at operation S33, the controller 40 selects the restoration program of the second storage unit 30 to be updated on the basis of the program list of the first storage unit 20 at operation S34. The controller 40 selects and copies the first update file 23 of the program 21 corresponding to the selected restoration program 31, and stores it in the second storage unit 30 as the second update file 33 at operation S35. The controller 40 updates the selected restoration program 31 with the stored second update file 33 at operation S36, and updates the restoration program list 34 at operation S37. Then, if a certain key input is received through the user input unit 50 at operation S38, the controller 40 restores the program of the first storage unit 20 on the basis of the updated restoration program at operation S39.

Accordingly, the computer system 100 according to the first and second exemplary embodiments of the present general inventive concept updates even the restoration program stored in the hidden partition in accordance with the update of the program installed in the main partition, so that the program installed in the main partition can be updated with the updated program even though it is restored by the stored restoration program.

As illustrated above, according to an exemplary embodiment, since a restoration program is updated corresponding to a program installed in the computer system if the program is undated with the latest version, the program can be restored with the updated restoration program, and the latest version of the restored program is maintained, thereby enhancing a user's convenience.

Although a few exemplary embodiments have been shown and illustrated, it will be appreciated by those skilled in the art that changes may be made in these exemplary embodiments without departing from the principles and spirit of the general inventive concept, the scope of which is defined in the appended claims and their equivalents.

What is claimed is:

1. A computer device comprising:
a communication unit which communicates with a server; and
a storage unit comprising a first storage area as a main partition in which at least one program and a management program are installed, and a second storage area as a hidden partition in which a restoration program configured to restore the program is stored, the management program configured to manage the restoration program,
wherein the hidden partition is not recognized by a first operating system as a normal drive and is accessed using a separate virtual file system interface;
wherein the management program receives a list of up-to-date programs through the communication unit from the server and selects at least one of the restoration program among a pre-stored restoration program list based on the received list of up-to-date programs, and
wherein the computer device boots a second operating system after receiving a restoration key through user input, compares program lists of the first storage area and the second storage area, and when the program lists are not the same, restores program files in the first storage area with the restoration programs in the second storage area.

2. The computer device according to claim 1, wherein the management program compares the pre-stored restoration program list with the list of up-to-date programs and selects the at least one of the restoration program according to comparison result.

3. The computer device according to claim 2, wherein the management program determines the restoration program to be selected when a software version of the restoration program is previous than a software version of corresponding program of the list of up-to-date programs.

4. The computer device according to claim 1, configured to operate under one of the first operating system and the second operating system,
wherein the first storage area is normally accessed under the first operating system or the second operating system, the second storage area is accessed under the second operating system, and the second storage area is determined to invalid storage and cannot be accessed under the first operating system.

5. The computer device according to claim 4, wherein the first operating system is installed in the first storage area and the second operating system is installed in the second storage area.

6. The computer device according to claim 4, wherein, if a predetermined key input is received from an user input unit under the first operating system, the management program boots up the second operating system to access to the second storage area and stores a selectively downloaded file based on a software version of the restoration program in the second storage area as the restoration program.

7. The computer device according to claim 4, the management program is able to restore the program with the restoration program under the second operating system.

8. The computer device according to claim 1, the management program transmits system information of the computer device to the server and requests for the list of up-to-date programs corresponding to the system information to the server.

9. A control method of a computer device including a storage unit comprising a first storage area as a main partition in which at least one program and a management program are installed and a second storage area as a hidden partition in which a restoration program configured to restore the program is stored, the control method by the management program comprising:
receiving a list of up-to-date programs from a server communicating with the computer device;
selecting at least one of the restoration program among a pre-stored restoration program list based on the received list of up-to-date programs;
wherein the hidden partition is not recognized by a first operating system as a normal drive and is accessed using a separate virtual file system interface; and
wherein the computer device boots a second operating system after receiving a restoration key through user input, compares program lists of the first storage area and the second storage area, and when the program lists are not the same, restores program files in the first storage area with the restoration programs in the second storage area.

10. The control method of the computer device according to claim 9, wherein the selecting comprises comparing the pre-stored restoration program list with the list of up-to-date programs and selecting the at least one of the restoration program according to comparison result.

11. The control method of the computer device according to claim 10, wherein the comparing comprises determining the restoration program to be selected when a software version of the restoration program is previous than a software version of corresponding program of the list of up-to-date programs.

12. The control method of the computer device according to claim 9, the computer device is configured to operate under one of the first operating system and the second operating system,
wherein the first storage area is normally accessed under the first operating system or the second operating system, the second storage area is accessed under the second operating system, and the second storage area is determined to invalid storage and cannot be accessed under the first operating system.

13. The control method of the computer device according to claim 12, wherein the first operating system is installed in the first storage area and the second operating system is installed in the second storage area.

14. The control method of the computer device according to claim 12, further comprising boots up the second operating system to access to the second storage area if a predetermined key input is received from an user input unit under the first operating system,
   wherein the downloading comprises storing a selectively downloaded file based on a software version of the restoration program in the second storage area as the restoration program.

15. The control method of the computer device according to claim 12, the management program is able to restore the program with the restoration program under the second operating system.

16. The control method of the computer device according to claim 9, the receiving comprises transmitting system information of the computer device to the server and requesting for the list of up-to-date programs corresponding to the system information to the server.

* * * * *